March 27, 1962 G. I. FOLSOM 3,026,694
KNITTING MACHINE
Filed April 23, 1958 10 Sheets-Sheet 1
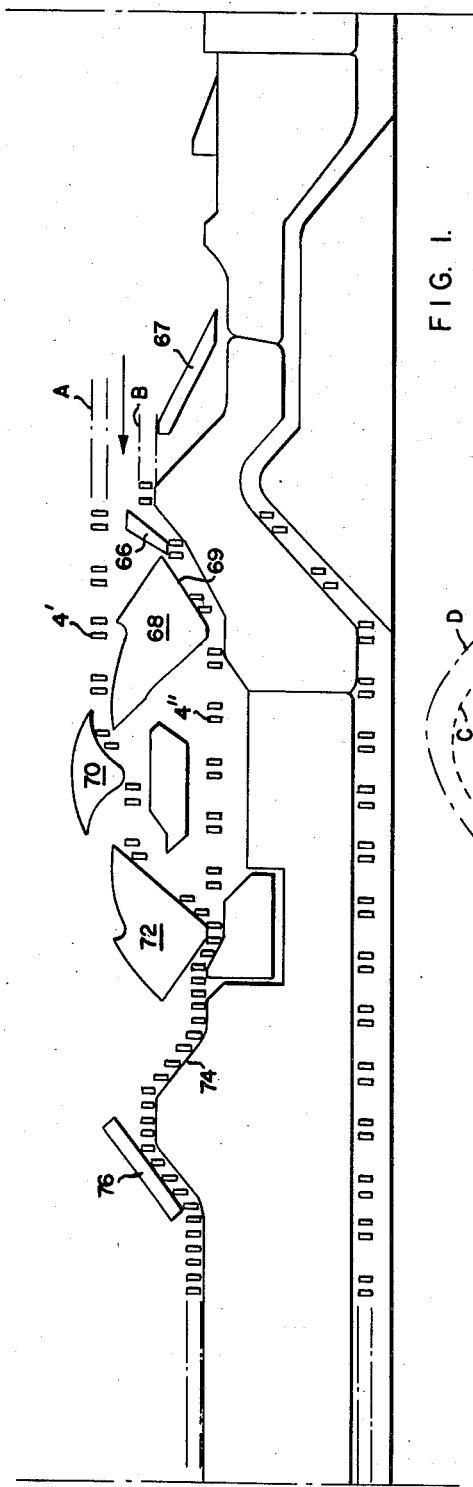
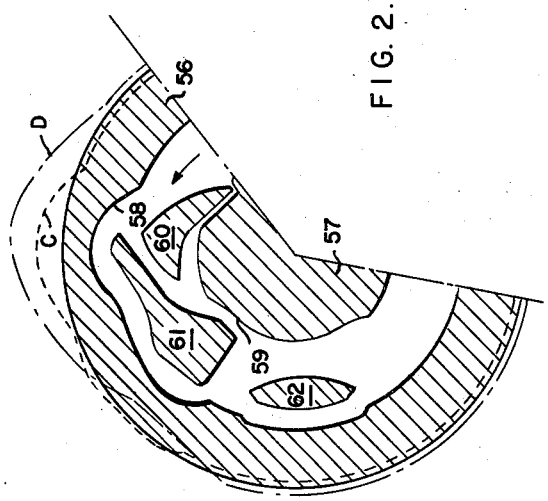
INVENTOR.
GEORGE I. FOLSOM
BY
ATTORNEYS March 27, 1962

G. I. FOLSOM 3,026,694

KNITTING MACHINE

Filed April 23, 1958

INVENTOR.
GEORGE I. FOLSOM
BY
ATTORNEYS

March 27, 1962 G. I. FOLSOM 3,026,694
KNITTING MACHINE
Filed April 23, 1958 10 Sheets-Sheet 3

INVENTOR.
GEORGE I. FOLSOM
BY
ATTORNEYS

March 27, 1962 G. I. FOLSOM 3,026,694
KNITTING MACHINE
Filed April 23, 1958 10 Sheets-Sheet 4
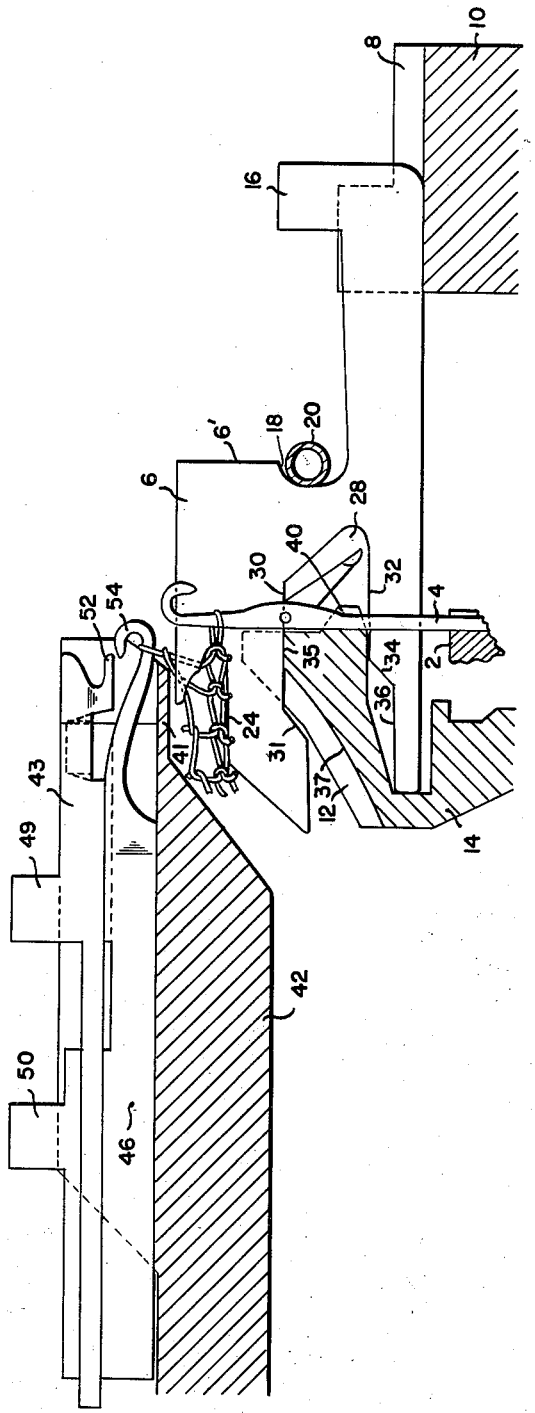
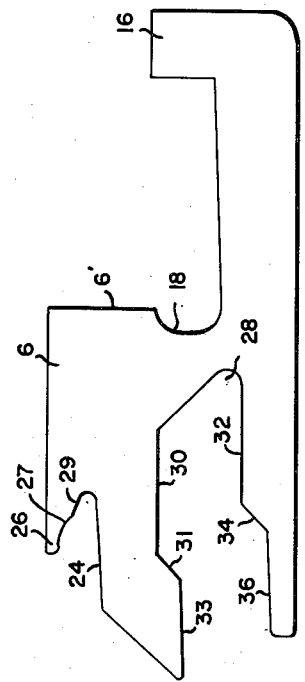
INVENTOR.
GEORGE I. FOLSOM
BY
ATTORNEYS

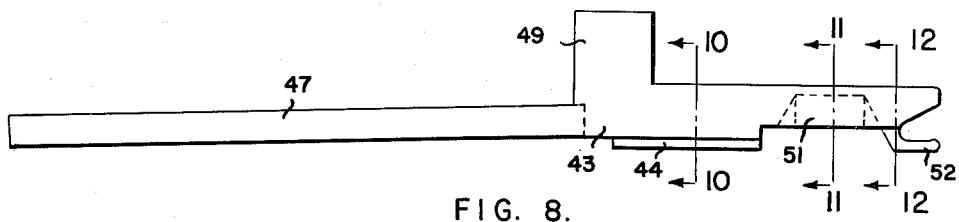
FIG. 8.
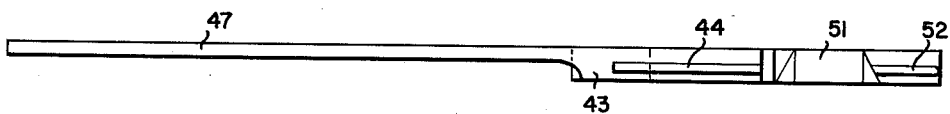
FIG. 9.
 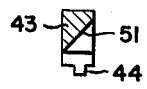 
FIG. 10.   FIG. 11.   FIG. 12.
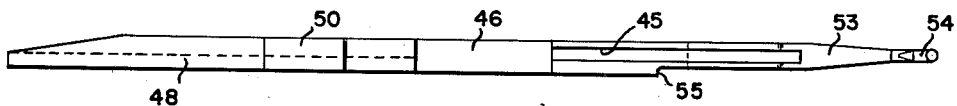
FIG. 13.
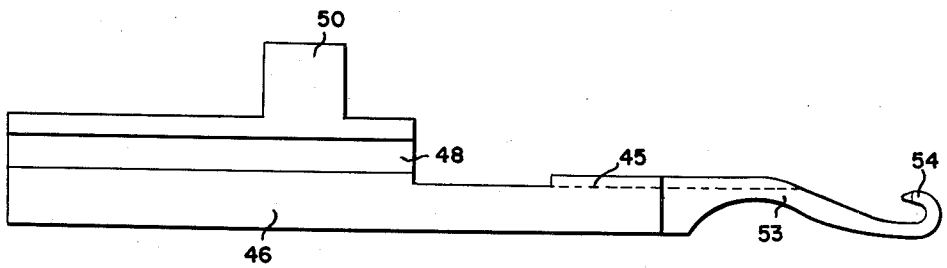
FIG. 14.

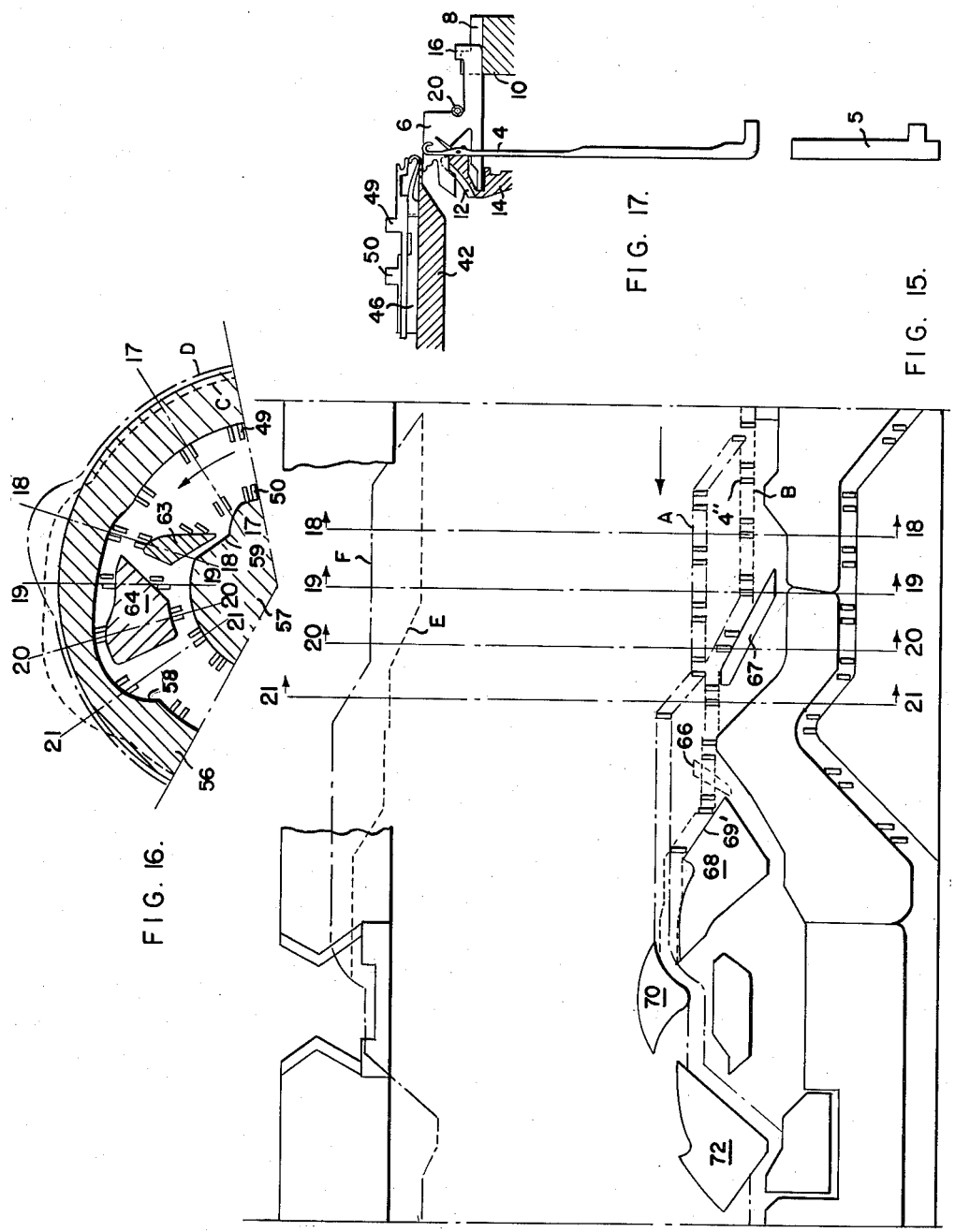

March 27, 1962 G. I. FOLSOM 3,026,694
KNITTING MACHINE
Filed April 23, 1958 10 Sheets-Sheet 7

INVENTOR.
GEORGE I. FOLSOM
BY
ATTORNEYS

March 27, 1962 G. I. FOLSOM 3,026,694
KNITTING MACHINE
Filed April 23, 1958 10 Sheets-Sheet 8

INVENTOR.
GEORGE I. FOLSOM
BY
ATTORNEYS

March 27, 1962 G. I. FOLSOM 3,026,694
KNITTING MACHINE
Filed April 23, 1958 10 Sheets-Sheet 9

INVENTOR.
GEORGE I. FOLSOM
BY
ATTORNEYS

March 27, 1962 G. I. FOLSOM 3,026,694
KNITTING MACHINE
Filed April 23, 1958 10 Sheets-Sheet 10

INVENTOR.
GEORGE I. FOLSOM
BY

ATTORNEYS

3,026,694
KNITTING MACHINE
George I. Folsom, Laconia, N.H., assignor to Scott & Williams, Incorporated, Laconia, N.H., a corporation of Massachusetts
Filed Apr. 23, 1958, Ser. No. 730,318
4 Claims. (Cl. 66—13)

This invention relates to a knitting method and a circular machine having cylinder and dial needles for making ribbed band articles, particularly ribbed top hosiery.

The patent to R. W. Scott, No. 1,641,101, dated August 30, 1927, describes the details of the machine and method for start-up on bare needles, knitting of ribbed tops, and transferring loops from dial needles to cylinder needles to the completion of rib knitting.

The patent to R. H. Lawson, No. 2,719,415, dated October 4, 1955, discloses dial shogging means for desired positioning of dial needles relative to cylinder needles for the formation of ribbed tops having improved characteristics of both appearance and elasticity.

The patent to R. H. Lawson, No. 2,783,629, dated March 5, 1957, discloses sinker controlling means to move saw tooth sinkers radially inward during rib knitting and radially outward beyond the feeding point to improve fabric tensioning.

My patent, No. 2,829,508, dated April 8, 1958, discloses utilization of dial shogging for effecting an improved make-up, as well as further improvements in sinker controlling means that impart radially inward as well as axially downward movement to special sinkers, not of saw-tooth type. In accordance with this patent dial needles are circumferentially aligned with inactive cylinder needles during rib knitting, and the sinkers act on bights between cylinder and dial loops and, in the case of 2 x 2 rib knitting, also on bights between adjacent dial loops.

My application, Serial No. 687,818, filed October 2, 1957, now U. S. Patent No. 2,909,048, discloses a high neb special rib take-up sinker. The radially inward movement of this sinker enables the high neb to engage, and move inwardly, loops drawn by dial needles in a course preceding that involving loops held by the dial needles to effect a still different and improved method of ribbed fabric take-up.

It will be understood that the machines of the above-mentioned patents and application, as well as that of the present invention do not require the use of a take-up or fabric tensioning device of conventional design and are therefore capable of releasing each article as knitting is completed.

The present invention relates in part to the same general subject matter as my above-mentioned patent in that it involves a further improvement in means for effecting special sinker movements for the proper tensioning of rib fabric as it is produced.

The aforementioned Scott Patent 1,641,101 discloses transferring, at the completion of rib knitting, the loops drawn by the dial needles of a course preceding the last course of dial needle loops, to the previously inactive cylinder needles. In contrast thereto, the present invention particularly concerns the transferring of the last formed dial needle loops to the previously inactive cylinder needles. In accordance with the invention, during the transfer operation, high neb sinkers are held inward to restrain the fabric, while special features of two-part dial needles afford positive control for positioning the last formed dial loops directly over the heads of rising cylinder needles at the point of transfer. The continuous enchaining of the last formed dial loops with the loops next formed by the needles to which the dial loops were transferred, affords a smooth, unbroken transition from rib knitting to plain knitting. The bulk of extra dial needle loops, and the ragged appearance at the transfer course, characteristic of the prior transfer, are eliminated by this method which allows the production of rib top articles of high quality and improved appearance.

The objects of the invention relating to the attainment of the aforegoing results and other objects relating to details of construction and operation will become apparent from the following description read in conjunction with the accompanying drawings, in which:

FIGURE 1 is an inside development of the cams for acting upon the butts of cylinder needles and jacks, particularly during rib knitting;

FIGURE 2 is a segment of a horizontal section of the dial cap showing the rib knitting cams for acting upon the hook and cast-off members of the two-part dial needles;

Figure 3:
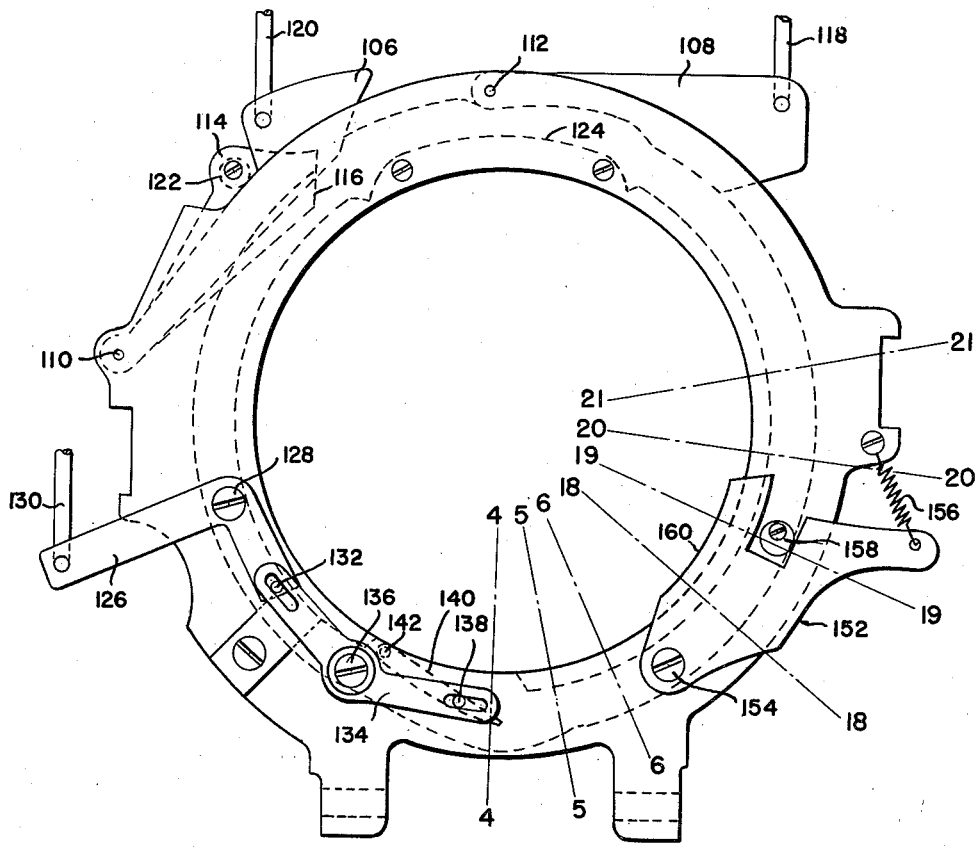
FIGURE 3 is a plan view of the sinker cap showing sinker controlling cams and operating means therefor.
Figure 4:
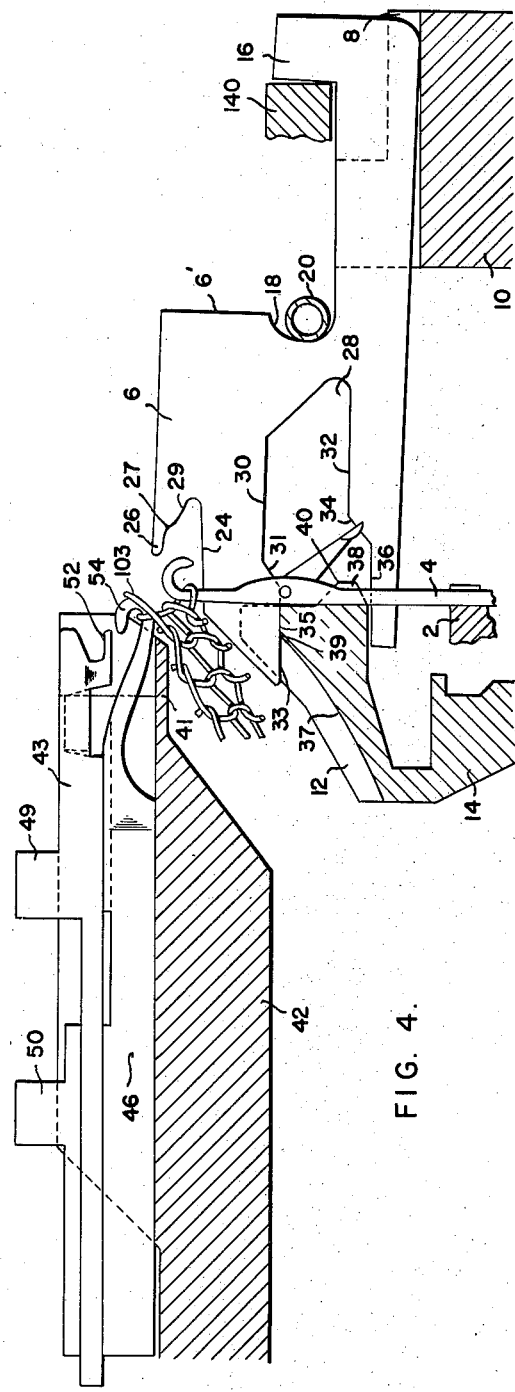
Figure 5:
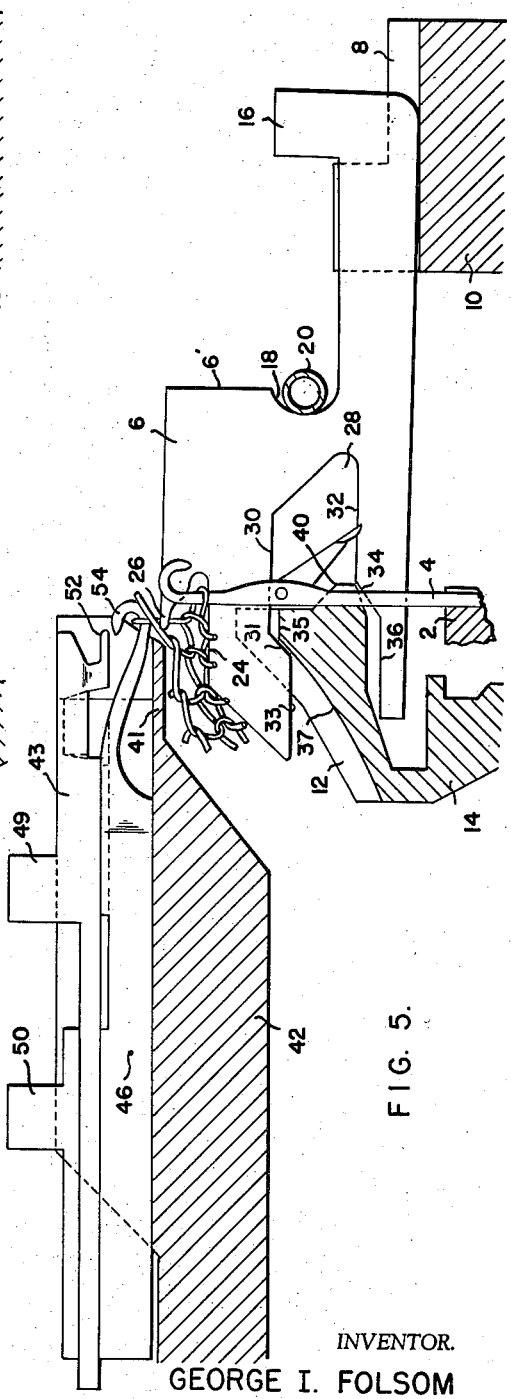
Figure 22:
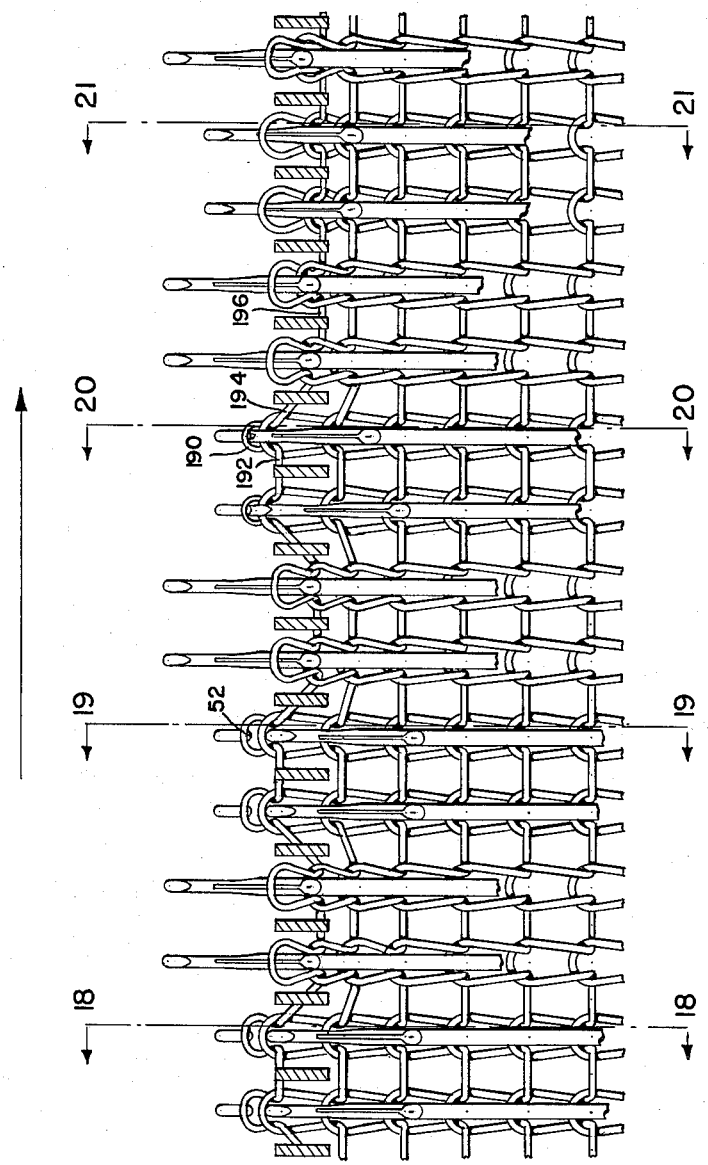
Figure 23:
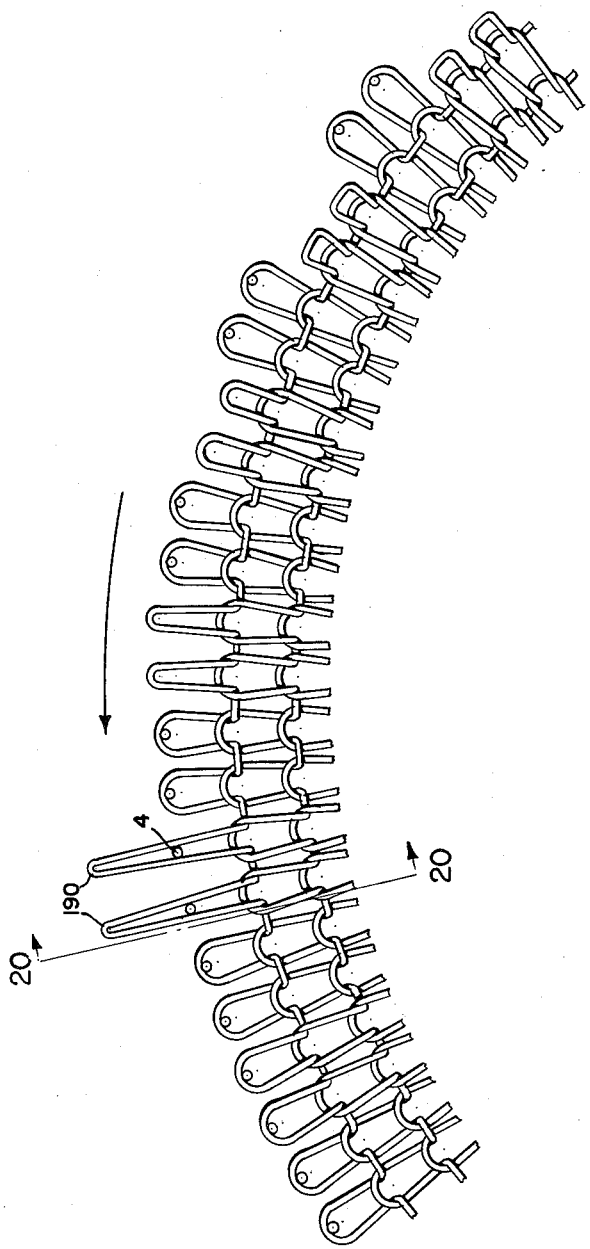

FIGURES 4, 5 and 6, inclusive, are enlarged axial sections showing the relationships of cylinder and dial needles and sinkers during rib knitting, the various sections being taken on the axial planes at 4—4, 5—5 and 6—6, respectively, in FIGURE 3;

FIGURE 7 is an enlarged elevation of a sinker;

FIGURE 8 is an enlarged elevation of the cast-off element of a two-part dial needle;

FIGURE 9 is an enlarged bottom plan view of the cast-off element shown in FIGURE 8;

FIGURES 10, 11 and 12, inclusive, are vertical cross-sections taken on the planes 10—10, 11—11 and 12—12, respectively, in FIGURE 8;

FIGURE 13 is an enlarged top plan view of the hook element of the two-part needles;

FIGURE 14 is an enlarged elevation of the hook element shown in FIGURE 13;

FIGURE 15 is an inside development of the cams for acting upon the butts of the cylinder needles and jacks particularly illustrating operations during transfer;

FIGURE 16 is a segment of a horizontal section of the dial cap showing the transfer cams for acting upon the hook and cast-off elements of the two-part dial needles;

FIGURE 17 is an axial section showing the relationships of cylinder needles, auxiliary jacks, dial needles and sinkers prior to transfer, the section being taken on the axial plane 17—17 in FIGURE 16;

FIGURES 18, 19, 20 and 21, inclusive, are enlarged axial sections showing the relationships of cylinder and dial needles and sinkers during transfer, the various sections being taken on the axial planes 18—18, 19—19, 20—20 and 21—21, respectively, in FIGURES 3, 15 and 16;

FIGURE 22 is an enlarged development of a portion of the needle circle looking radially inwardly showing a few partial courses of 2 x 2 rib fabric and part of a transfer course; and FIGURE 23 is an enlarged view of a few partial courses of 2 x 2 rib fabric and part of the transfer course as seen when looking vertically downward along the needle circle.

With the exception of the transfer, the stockings produced in accordance with the invention are essentially as described in said Scott and Lawson patents and in my patent and application referred to above, and, accordingly, there are illustrated only those changes and parts which are particularly concerned with the attainment of the objects of the present invention.

The hosiery machine comprises the slotted needle cylinder 2 in which are mounted latch needles indicated at 4. As is usual, these needles are provided with butts arranged to be acted upon by suitable cams, there being made provision for differentiating the needles to render selectively active and inactive groups thereof in the knitting of rib fabric, the differentiation being obtained through the use of jacks hereafter described.

In accordance with the disclosures of said Scott and Lawson patents, saw-tooth sinkers alternate with plain sinkers between pairs of adjacent cylinder needles. In accordance with the present invention saw-tooth sinkers are not used, but instead between each pair of cylinder needles there is located a sinker 6, of the type illustrated in FIGURE 7, the sinkers being guided for radial movements by reception in slots 8 of the sinker dial 10 and by reception in slots 12 in the cylinder top 14. Each sinker is provided with a butt 16 which is acted upon by cams as hereafter described in greater detail to impart radial movements thereto. Each sinker is also provided with a socket 18 in which there engages the spring band 20 which serves to urge the sinkers yieldingly inwardly.

Each sinker is provided with a ledge 24 over which stitches are drawn by the needle hooks during plain knitting, and with a neb 26 which, as most clearly shown in FIGURE 7, is provided with downwardly curved ledge 27 and angular ledge 29 for the proper engagement of bights of yarn extending between adjacent cylinder and dial loops.

Each sinker is also provided with an opening or slot indicated generally at 28 which has a lower edge comprising straight portion 32 and slightly angled portion 36 joined by a sloping portion 34 which is arranged to be cammed by a corresponding corner 38 at the outer lower edge of a wall 40 defining needle guiding slots in the periphery of the cylinder top 14. An upper edge of slot 28 comprises a straight portion 30, a sloping portion 31 and a slightly angled portion 33 which are arranged to slidably engage the straight portion 35, and the radius 37 that form the bottom of sinker slot 12 in cylinder top 14.

The spacings between the edges 36 and 33, and 32 and 30, respectively, are just slightly greater than the vertical thickness of the flange portion of cylinder top 14 as will be clear from FIGURES 4 and 6, respectively. Likewise, the spacing between the edges 34 and 31 is just slightly greater than the distance between corner 38 and corner 39 across the flange portion 40 of cylinder top 14 as will be clear from FIGURE 5.

A radially slotted dial is provided at 42 and is automatically vertically movable, as described in the Scott patent. Within radial slots in the dial there are mounted two-part dial needles. Arrangement of the dial slots relative to the cylinder needles is dependent on the type of rib knitting desired. The drawings illustrate a typical 2 x 2 set-up.

Referring to a dial needle, the cast-off element 43 has an offset tongue 44 on its shank, as clearly seen in FIGURES 10 and 11, that slidably engages groove 45 in the shank of hook element 46. The tail 47 on cast-off element 43 is frictionally slidable in slot 48 at the side of hook element 46. Cast-off element 43 has a butt 49.

Hook element 46 has a butt 50. A bevelled cut-out 51 is provided near the outside end of cast-off element 43. The angle of this bevel is seen in FIGURE 11. Cast-off element 43 is provided with a point 52 to engage the loop of yarn formed over shank 53 of hook element 46. Groove 45 in hook element 46 is in alignment with the hook end 54. The back shank portion of hook element 46 is of greater thickness than the thickness at the forward or hook end 54. This added thickness is on one side, as seen at 55 in FIGURE 13. The center line of the point 52 of cast-off element 43 aligns with the center line of the hook end 54 on hook element 46, as the result of the proper amount of offset of tongue 44 on cast-off element 43. Butts 49 and 50 on the respective elements are arranged to be acted upon by dial cams such as indicated in FIGURES 2 and 16, respectively, including the dial cap members 56 and 57 provided with cam surfaces 58 and 59, respectively, rib knitting cams 60, 61 and 62, and transfer cams 63 and 64. Neb end 52 of cast-off element 43 follows the dotted path C and hook end 54 of hook element 46 follows the dot-dash path D.

The butts of the cylinder needles are arranged to be acted upon by the switch cam 66, the reverse stitch cam 68, the center cam 70, the forward stitch cam 72, the rise cam 74 and the lowering cam 76. In FIGURE 1 the needle butts are differentiated as they would be in 2 x 2 rib knitting, the needle butts shown being arranged in two groups 4' and 4", the former being active during rib knitting and the latter being inactive. The differentiation between the active and inactive needles is obtained through the arrangement of auxiliary jacks 5 beneath the active needles as disclosed in said Scott patent. During rib knitting, active needles pass the cams which have been described along butt path A, the butts passing over the reverse stitch cam 68 and being depressed by cams 70 and 72 to take yarn at the feed of the machine, then being raised by cam 74 and lowered by cam 76. The butts 4" of needles which are inactive during rib knitting follow the butt path B and are depressed below the leading point of the reverse stitch cam 68 by switch cam 66 and lowered by cam surface 69, thereafter moving horizontally to join the butts 4' to be raised by cam 74 and then lowered by cam 76.

During transfer, as seen in FIGURE 15, butts 4" of previously inactive needles are raised by cam 67. During the transfer course switch cam 66 is withdrawn and the butts 4" are further raised by cam surface 69' of stitch cam 68, thereafter moving horizontally to join butts 4' of previously active needles and be depressed by cams 70 and 72 to take yarn at the feed of the machine. The path of the previously inactive cylinder needle hooks is represented by dotted line E, and the path of the active cylinder needle hooks is represented by dash-dot line F.

As described in my patent and application, the dial needles draw their stitches during rib knitting somewhat later than the cylinder needles, and cast-off is effected by means of an outside point 52 to minimize stretching of the dial stitches, and to afford wider bights between the rib and the plain loops.

The dial shogging mechanism of the machine of this invention is of the type described in Lawson Patent 2,719,415 and operated as described in my prior patent and application. It is, therefore, neither illustrated nor described herein.

Reference may now be made particularly to FIGURE 3 which shows the cams for control of sinker movements. The regular forward and reverse knock-over cams are illustrated at 106 and 108, respectively. The former of these is pivoted at 110 and the latter at 112. A rib knock-over cam 114 having its active rise at 116 is pivoted also at 110 independently of cam 106. The reverse knock-over cam 108 is controlled by a link 118 from the main cam drum of the machine in conventional fashion while the forward knock-over cam 106 is similarly controlled by a link 120. The inner position of cam 114 is adjusted by means of the eccentric 122 which abuts a portion of the sinker cap which carries all of the parts of the sinker control system. The cam 114 is urged inwardly by the action of a spring, not shown, as described in said Scott patent.

A sinker withdrawing cam 124 arranged to act on the sinker butts 16 is fixed in position as described in said Lawson Patent 2,783,629.

A bell crank 126 pivoted to the sinker cap at 128 is arranged to be controlled from the main cam drum through a push rod 130 and is provided with a pin 132 engaging a slot in one end of a lever 134 pivoted to the sinker cap at 136. The other end of this lever 134 is slotted to embrace a pin 138 extending upwardly through a slot in the sinker cap and carried by a cam 140 which is pivoted to the sinker cap at 142. The cam 140 is also illustrated in FIGURE 4.

Beyond the position of the cam 140 in the direction of needle rotation is a lever 152 pivoted to the sinker cap at 154 and urged by a spring 156 to an inner position limited by an adjustable eccentric stop 158 carried by the sinker cap. A cam edge 160 of the lever 152 is arranged to engage the edge 6' of each sinker to aid in moving it inwardly, the cam 160 serving to augment the action of the spring band 20.

It may be here noted that the sinker and cylinder needle cams are so related that the position of the lowermost point of the forward stitch cam 72 just precedes the innermost point of the cam 106. The cams 140 and 160 are, accordingly, active in that region in which the needles in the cylinder are at the level determined by their downward movement under cam 76. The cylinder needles shown in FIGURES 4, 5, 6 and 17 are shown in this position. The dial needles in these figures are in the position attained following the action of cams 58 and 63.

As a preliminary to description of the operation, reference may first be made to the normal position of dial needles relative to cylinder needles during rib knitting. Irrespective of the type of rib which is being formed, the number of dial needles set up in the dial is equal to the number of cylinder needles inactive during rib knitting. In 1 x 1 and 2 x 2 rib knitting, for example, the number of dial needles is one-half the total number of cylinder needles. During rib knitting in accordance with the present invention the dial needles are substantially in precise alignment with the inactive cylinder needles with the result that wherever a cylinder needle is adjacent to a dial needle a sinker is midway between them. It will be noted that in accordance with the present invention, the dial is not provided with fins such as are conventionally used when saw-tooth sinkers are used.

The various methods of make-up using the dial shogging features are fully described in my patent and therefore are not described herein.

During the formation of the welt since only two courses are involved prior to the beginning of rib knitting it is immaterial whether the sinkers are or are not operated in the fashion involved in rib knitting as will now be described. In other words, it is not material whether the cam 140 is active or inactive, since the sinker nebs 26 do not attempt to lower the dial loops until actual rib knitting begins.

It will be evident that other types of welt formation may be used consistently with the invention and in accordance with known practices. For example, there may be 1 x 1 makeup without shog; or tucked makeup may be used. Various types of broad rib constructions may be produced following makeup.

The function of the sinkers in accordance with the invention during rib knitting is essentially the same irrespective of the type of rib which is being produced, and accordingly the description may be made common to any desired type of rib knitting. What is invoved particularly in knitting 1 x 1 rib fabric are the actions of the sinkers which lie between the adjacent active cylinder and dial needles, the sinkers acting particularly on the bights of yarn extending between the cylinder and dial loops; while in knitting 2 x 2 rib fabric, the sinkers which lie between adjacent dial needles are also involved.

Aside from the special sinker actions, the operations involved in rib formation are conventional, the dial and cylinder needles moving in the usual fashion, the cams 106 and 108 being withdrawn so that the cam 116 is active on the sinkers following the drawing of stitches in the usual fashion. The special sinker actions start with the withdrawal of the sinkers by the action of cam 140 which is active during rib knitting. As shown in FIGURE 3, cam 140 has been moved to its active position. Referring first to FIGURE 4, as the sinkers are withdrawn by cam 140, sloping portion 31 of sinker slot 28 contacts corner 39 in cylinder top 14 to lift the inner ends of the sinkers with their outer ends acting as fulcrums. Slightly angled portion 33 slidably engages the straight portion 35 of sinker slot 12 and edge 36 just clears the lower surface of the flange of cylinder top 14 when the sinkers are in the outermost position as illustrated. When the cam 140 releases a sinker, the spring band 20 is free to act thereon to start the sinker moving inwardly. This inward movement is, of course, gradual since the spring band must extend from the last sinker engaged by cam 140 tangentially to the position corresponding to the innermost positions of the sinkers. As the sinkers thus move inwardly they continue to a position indicated approximately at 5—5 in FIGURE 3 where the bevel 34 reaches the position of the corresponding corner 38 of cylinder top 14. The slopes at 34 and 31 correspond so that as the sinker moves inwardly it moves downwardly under substantially full control against any appreciable free upward or downward movements. Thus its neb 26 moves inwardly and downwardly in a predetermined sloping path. As this movement takes place the neb just clears the peripheral edge 41 of the dial and overlies and moves downwardly the bight of yarn which extends between the flanking cylinder and dial needles or that extending between adjacent dial needles. As the sinkers continue movement to a position indicated approximately at 6—6 in FIGURE 3, they move substantially radially as illustrated in FIGURE 6, being held against rise by the flange of the cylinder top which engages the edge 32. Any excessive downward movement is limited by the edge 30 which extends over the top of this flange. As this inward movement occurs the neb 26 cams downwardly the bight of yarn extending between the flanking needles and the neb passes above one or more additional bights previously formed. The downwardly curved ledge 27 and angular ledge 29 provide, respectively, means for lowering the bight with its connected dial stitch and for holding down the cylinder stitch against the action of rising cylinder needles.

To avoid restraining action by the spring band 20 during the upward and downward movements of the sinkers, the sockets 18 are elongated allowing the spring band 20 to closely follow a horizontal path.

By referring to FIGURES 4, 5 and 6, it will be seen that except for the lowering action just described, the previously formed stitch 103 would remain as shown in FIGURE 4 to be entered and caught by the dial hook 54 as it moved out to take yarn, and result in a "loading up" or non-knitting condition.

Since during rib knitting the dial needles occupy the same angular positions as the inactive cylinder needles, and since the sinkers are midway between the cylinder needles, it will be evident that the action on the formed loops satisfies the requirements which are discussed in said Lawson patent, i.e., that the bights between loops should be engaged by takeup or tensioning elements (the sinkers) during rib formation rather than any of the needle loops. The result is a fabric which is highly satisfactory and elastic having substantially the characteristics of rib fabric knit with benefit of a conventional takeup.

The rib knitting actions just described are essentially as described in my Patent 2,829,508 with the exceptions that the sinkers are restrained against free downward movements and are moved inwardly solely by the spring band rather than by positive cam action.

In this discussion of rib knitting the inward movements of the sinkers were ascribed to rib knitting. However, the sinkers have the further function of maintaining tension on rib stitches during transfer, as will now be described in further detail.

Since shogging is possible in this machine it is desirable during the transfer to shift the dial slightly in the direction opposite that of cylinder rotation though this is only to insure that the inactive cylinder needles will with certainty pass to the front of the dial needles during the transfer operation, the dial needles having desirably been substantially in direct alignment with the inactive cylinder needles during the rib knitting.

Figure 18:
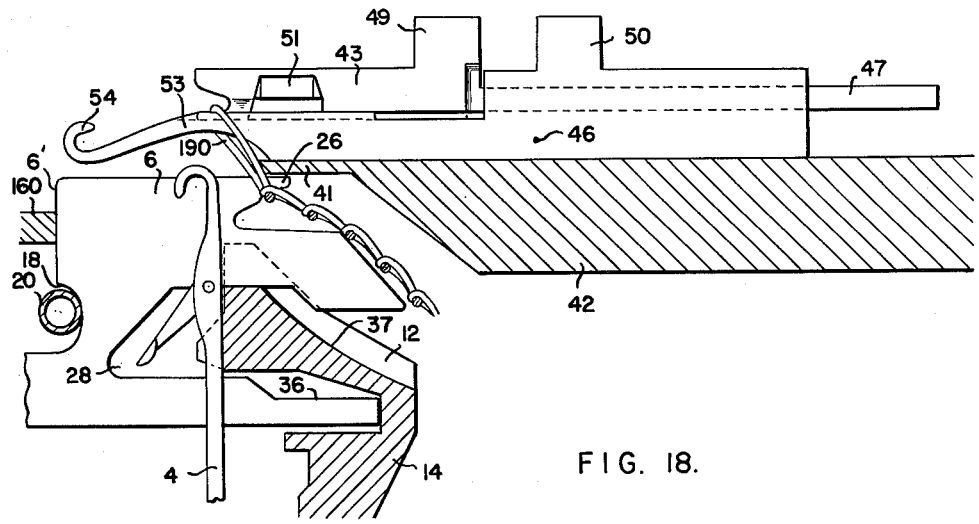
Figure 19:
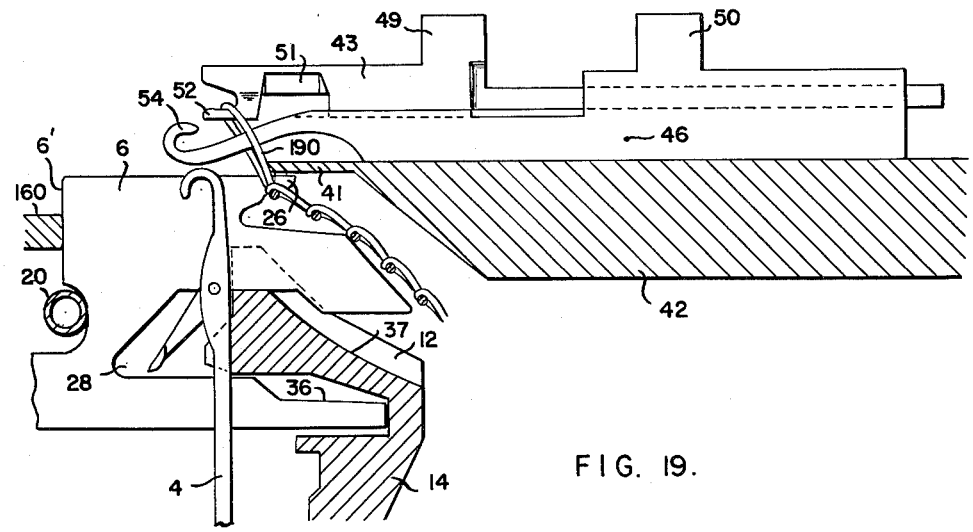
Figure 20:
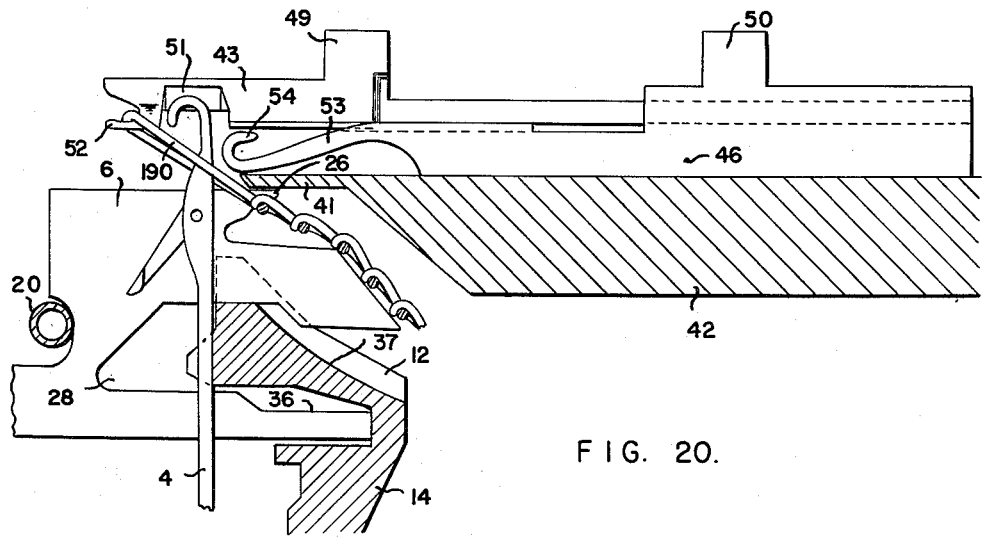

Referring to FIGURE 16, cams 63 and 64 are depressed into action and withdrawn in the conventional manner for the transfer operation. Hook element butts 50 follow the inside butt path along the outer edge of cam 63 and pass along the inner edge of cam 64. Dot-dash line D represents the path of hook end 54. Cast-off element butts 49 follow the outside butt path (FIGURE 16) and are urged outward by action of cam 63 against hook element butt 50 which in turn frictionally pushes cast-off butt 49 out far enough to allow it to engage the outer edge of cam 64 which urges the cast-off element further outward. Dotted line C represents the path of point 52 of cast-off element 43. Cam action by portion 58 of the outside raceway returns the cast-off element 43 inwardly to the inactive position. At section 18—18 the hook element 46 is extended outwardly to the greatest extent and cast-off element 43 is extended partially to engage a loop 190 held on hook shank 53 as illustrated in FIGURE 18. As the hook element 46 is retracted, cast-off element 43 continues to move outward with loop 190 retained on point 52 as illustrated in FIGURE 19. During this action, the bight of yarn 192, extending between adjacent dial needles is retained by sinker neb 26 on ledge 27. Since the strain at this time is substantially greater due to dial loops being taken from the hook members and carried outward, it is desirable to augment the action of the spring band 20 by cam 160 which, urged by spring 156 (FIGURE 3) acts on edges 6' of the sinkers 6 to insure their complete inward movement and engagement with the last formed bight 192. Reference may now be made to FIGURE 15. Up to this point in the transfer course cylinder needles having butts 4'' have been at a low inactive level as illustrated by path B at 18—18 and 19—19, but cam 67 raises these needles to transfer height indicated by path E as the transfer operation continues and a loop 190 is positioned over a rising needle by full extension of cast-off element 43, and the needle passes through the last formed dial loop 190, this occurring at a position indicated approximately at 20—20 in FIGURES 15 and 16 and is clearly illustrated in FIGURE 20.

It is at this point during the transfer operation that the advantages of the features of the two-part dial needle are apparent. When the dial is located, prior to transfer, the object is to accurately position the loop on the dial element directly over the head of the rising cylinder needle. However, by experience, it has been found, due to slight inaccuracies in the cylinder and dial slots and in the dial driving gear, that there is a possibility of fouling the cylinder needle head. This fouling occurred when conventional thickness two-part dial needles were used. The cylinder needle hooks were striking the bottom edges of the bevelled recess on the cast-off element resulting in breakage. These disadvantages have been overcome by increasing the thickness of the dial elements and off-setting the centers of points 52 and hook ends 54 relative to the centers of the dial slots. As a result of this increased thickness, a wider bevelled portion 51 is provided in the cast-off element 43 to insure, consistent with precise centering of the cylinder needle hook relative to loop 190, the location of the bottom edge of the bevel well to the rearward side of the cylinder needle hook, thereby to afford deflection of the rising hook to guard against any possibility of needle fouling.

Figure 21:
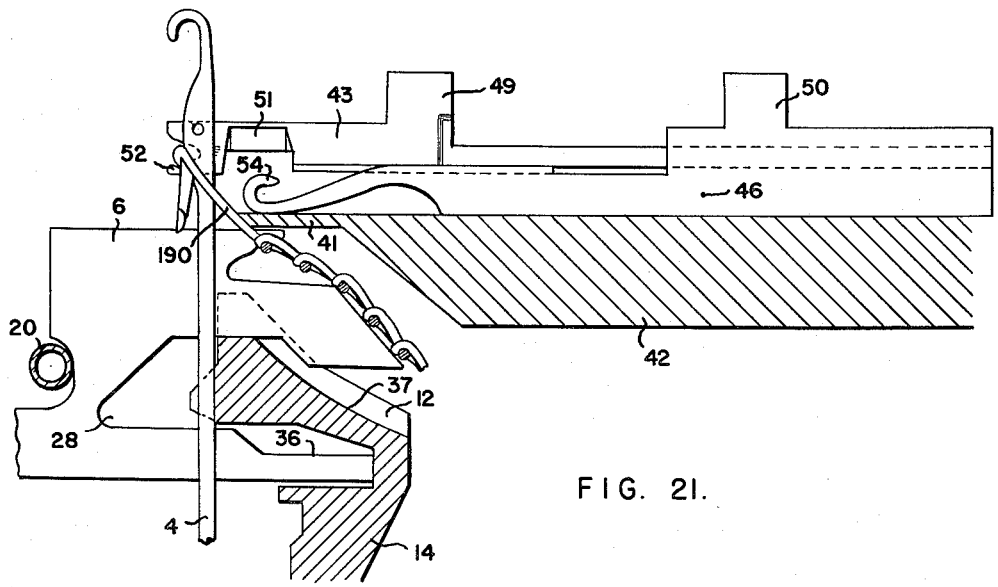

Referring now to FIGURE 21, loop 190 is around the shank and over the open latch of cylinder needle 4 which has been raised to the highest level during transfer. Hook element 46 is completely retracted and as the cast-off element 43 retracts, the transfer operation is completed. Again referring to FIGURE 15, switch cam 66 is withdrawn during the transfer operation and the previously inactive needles, to which the last formed dial loops were transferred, join the active needles to be depressed by cams 70 and 72 to take yarn at the feed of the machine and continue to knit plain fabric in the conventional manner.

FIGURE 22 shows a typical 2 x 2 arrangement of a panel of alternating pairs of active cylinder and dial needles as well as pairs of previously inactive cylinder needles, and associated sinkers, and a few courses of rib knitting formed thereby prior to transfer, the last formed loops being part of the transfer course. The various heights of the previously inactive cylinder needles are shown relative to the heights of the active cylinder needles during the progressive stages of the transfer operation as indicated at 18—18, 19—19, 20—20 and 21—21. As an example, at 20—20 the previously inactive needle 4 is rising through loop 190 that is stretched outward by point 52 over the needle circle. The bight of yarn 192 extending between the dial needles is retained by the downwardly curved sinker ledge 27 and is at a high level. The bight of yarn 194 between a previously inactive and an active cylinder needle angles downward and is engaged either on or in close proximity to the angular ledge 29 of sinker neb 26. The sinker flanked by active cylinder needles engages the bight of yarn 196 in the throat of the sinker substantially on ledge 24 at a lower level. The same 2 x 2 rib fabric with the last formed loops as part of the transfer course is shown in FIGURE 23. Although, necessarily, the sinker bars and the needle wales are not seen in their correct proportions, the extent to which the last formed dial loops 190 are moved radially outward over the needle circle to effect the transfer is illustrated especially at 20—20.

It will be obvious that various details may be varied from what has been described without departing from the invention which is accordingly not to be construed as limited except as required by the following claims.

What is claimed is:

1. In a circular knitting machine, a cylinder, a dial, cylinder and dial needles respectively carried thereby, cams for imparting stitch drawing movements to said cylinder and dial needles during rib knitting, sinkers having nebs for effecting inward movements of fabric, means for controlling said cylinder and dial needles to effect transfer from dial needles to cylinder needles of the last loops drawn by dial needles during rib knitting and means controlling said sinkers to cause them to restrain knitted fabric to provide elongation of said last loops during transfer.

2. In a circular knitting machine, a cylinder, a dial, cylinder and dial needles respectively carried thereby, cams for imparting stitch drawing movements to said cylinder and dial needles during rib knitting, sinkers having nebs for effecting inward movements of fabric, means for controlling said cylinder and dial needles to effect penetration by cylinder needles of the last loops drawn by dial needles during rib knitting while such loops are held by dial needles and means controlling said sinkers to cause them to restrain knitted fabric to provide elongation of said last loops drawn by dial needles during the penetration thereof by cylinder needles.

3. A circular knitting machine according to claim 1 in which said dial needles comprise relatively slidable hook and cast-off elements.

4. A circular knitting machine according to claim 2 in which said dial needles comprise relatively slidable hook and cast-off elements and in which said last loops are held by the cast-off elements during their penetration by cylinder needles.

References Cited in the file of this patent

UNITED STATES PATENTS

| | | |
|---|---|---|
| 925,036 | Scott | June 15, 1909 |
| 1,641,101 | Scott | Aug. 30, 1927 |
| 2,068,558 | McAdams | Jan. 19, 1937 |
| 2,198,626 | Lawson et al. | Apr. 30, 1940 |
| 2,399,002 | Coile | Apr. 23, 1946 |
| 2,719,415 | Lawson | Oct. 4, 1955 |
| 2,829,508 | Folsom | Apr. 8, 1958 |